Patented July 18, 1933

1,918,294

UNITED STATES PATENT OFFICE

GEORGE W. SEYMOUR, OF CUMBERLAND, MARYLAND, ASSIGNOR TO CELANESE CORPORATION OF AMERICA, A CORPORATION OF DELAWARE

CELLULOSIC ARTICLE AND METHOD OF PREPARING THE SAME

No Drawing.   Application filed April 28, 1932. Serial No. 608,140.

This invention relates to the preparation of foils, films, filaments, fabrics or other articles made of cellulose or its derivatives, and relates more particularly to rendering the same more impervious to moisture and the like.

An object of my invention is to render articles and particularly sheet-like articles made of cellulosic material more impermeable by applying thereto a substance comprising triacontane. Other objects of this invention will appear from the following detailed description.

Articles made of, or containing on the surface thereof, cellulose, regenerated cellulose, or cellulose derivatives are not as impervious to water, either in liquid or vapor state, as is often desired. For instance it has been found that thin foils made of regenerated cellulose or cellulose acetate plastics to be used in the wrapping of tobacco products or foodstuffs are more or less permeable so that moisture in the form of vapors may pass through the same, whereby the original humidity of the wrapped articles in time becomes altered.

I have found that if such articles have incorporated therein or are coated with triacontane, the articles are rendered more impervious to moisture, air or other gases.

In accordance with my invention I render articles made of, or containing cellulosic materials at least on the surface thereof, more impervious or waterproof by incorporating therein or applying thereto a coating containing triacontane.

Articles to be treated in accordance with this invention may be of any suitable form. This invention is particularly applicable to the treatment of foils or transparent paper having a thickness of the order of 0.0005" to 0.003" to be used for wrapping articles or for any other suitable purpose. The articles to be treated by this invention on the other hand may be in the form of films to be used for photographic, cinematographic or other purposes, or other sheet-like materials, which may be made by casting or flowing a solution of the cellulose or cellulose derivative onto smooth metallic or glass surfaces, such as film wheels, drums, bands, tables, etc. as is well known in the art. Other articles such as yarns, fabrics or articles made of plastic compositions containing derivatives of cellulose or of regenerated cellulose may be treated by this invention.

The articles to be treated by this invention may be made of or contain on at least the surface thereof any suitable cellulosic material, such as cellulose itself, regenerated cellulose, or derivatives of cellulose. The derivatives of cellulose include besides nitrocellulose, organic derivatives of cellulose such as organic esters of cellulose and cellulose ethers. Examples of organic esters of cellulose are cellulose acetate, cellulose formate, cellulose butyrate and cellulose propionate while examples of cellulose ethers are ethyl cellulose, methyl cellulose and benzyl cellulose. Generally if the articles are made of cellulose derivatives, there will be present plasticizers such as diphenylol propane, triacetin, diethyl phthalate, triphenyl phosphate, dibutyl phthalate, diethyl tartrate, dibutyl tartrate. In the case of foils containing acetone-soluble cellulose acetate, I have found that diphenylol propane is preferable as a plasticizer from the point of vew of impermeability. Any other desired materials such as pigments and effect materials may be incorporated, as is well known in the cellulose derivative plastic art.

In order to render said articles more impermeable, there is incorporated on at least one surface thereof a material comprising triacontane, $C_{30}H_{62}$, which is preferably of vegetable origin, but which may be of any other origin such as from petroleum. The triacontane may be conveniently applied to such surfaces in the form of a solution in a volatile liquid, such as diethyl ether, which preferably has no solvent action on the derivative of cellulose contained in the surfaces of such articles. The amount of triacontane required to be coated onto the surfaces of the articles in order to impart the desired degree of impermeability is relatively small, and therefore the solution of triacontane may be of relatively low concentration say on the order of 0.15 to 5%.

Better results may be obtained by incorporating in the solution of triacontane that is employed as a coating, binding agents, such as the derivatives of cellulose described above, to which may be added a plasticizer for the derivative of cellulose, and resins, which may be dammar, manila, acaroides or other natural resins, or synthetic resins such as the fusible and soluble phenol formaldehyde or diphenylol propane formaldehyde resins which are preferably prepared in the presence of an acid catalyst.

If foils or articles made of derivatives of cellulose are to be coated, the derivative of cellulose that may be employed in the coating composition should preferably be one of different solubility characteristics from the derivatives of cellulose in the articles so that a liquid may be used in the coating composition which is a solvent for the derivative of cellulose present therein but which is not a solvent for the derivative of cellulose in the article. Thus if foils, films or other articles made of acetone-soluble cellulose acetate are to be coated, the derivative of cellulose used in the coating composition may be benzyl cellulose, ethyl cellulose or cellulose nitrate. I have found that the use of benzyl cellulose in the coating composition produces superior results than in the case when cellulose nitrate is used from the point of view of increased impermeability.

The coating composition containing the triacontane may be applied to the surfaces in any suitable manner. Thus if films or foils are to be coated, the coating composition may be applied by brushing or spraying one or both sides of the same, or by dipping the same into a bath of such coating composition, and then permitting the same to dry.

Thin foils, films, sheets or other articles made or treated in accordance with this invention have greatly increased impermeability to moisture or other liquids. In some cases foils treated by this invention permit an amount of moisture to pass through them which is only 10 to 30% of the amount of moisture the untreated foil permits to pass through under like conditions. Thin foils prepared in accordance with this invention are eminently suitable for the wrapping of cigars, cigarettes or other tobacco articles and confectionery, cakes and other foodstuffs.

In order further to illustrate my invention, but without being limited thereto, the following specific examples are given.

*Example I*

Foil having a thickness of about 0.001" and comprising substantially 100 parts of acetone-soluble cellulose acetate and 20 parts of diphenylol propane as plasticizer, has applied thereto, on either one or both surfaces, the following solution:

| | Parts by weight |
|---|---|
| Triacontane | 3 |
| Diethyl ether | 100 |

The ether is then caused to evaporate. The foils so treated have greatly increased impermeability to moisture.

*Example II*

The foil described in Example I has applied thereto, on either one or both sides, a coating composition made as follows.

The following nonvolatile constituents:

| | Parts by weight |
|---|---|
| Benzyl cellulose | 200 |
| Diphenylol propane | 300 |
| Processed dammar | 100 |
| Triacontane | 2 | are dissolved in a volatile solvent consisting of

| | Parts by weight |
|---|---|
| Toluene | 50 |
| Ethyl acetate | 35 |
| Butyl acetate | 15 |

After drying, the foil is found to have an impermeability that is even greater than that treated in accordance with Example I.

*Example III*

The foil described in Example I has applied thereto on either one or both sides a coating composition made as follows:

| | Parts by weight |
|---|---|
| Nitrate cellulose | 200 |
| Diphenylol propane | 300 |
| Processed dammar | 100 |
| Triacontane | 2 | are dissolved in a volatile solvent consisting of

| | Parts by weight |
|---|---|
| Toluene | 50 |
| Ethyl acetate | 35 |
| Butyl acetate | 15 |

After drying, the foil is found to have greatly increased impermeability but not quite as great an impermeability as the foil treated in accordance with Example II.

The processed dammar employed in Examples II and III may be prepared for example by warming 10 parts by weight of pure Batavia or Singapore dammar with 5 parts by weight of benzene to form a complete solution and then adding 5 parts by weight of ethyl alcohol heated to the same temperature, the alcohol being added slowly with stirring. The precipitated wax-like material is then removed by settling or centrifuging, leaving a clear liquid which contains the processed dammar in solution.

It is to be understood that the foregoing detailed description is given merely by way of illustration and that many variations may be made therein, without departing from the spirit of my invention.

Having described my invention, what I claim and desire to secure by Letters Patent is:

1. The method of rendering surfaces of articles more impermeable comprising applying to surfaces of articles a coating comprising triacontane.

2. The method of rendering surfaces of cellulosic material more impermeable comprising applying to surfaces of cellulosic material a coating comprising triacontane.

3. The method of rendering surfaces of derivatives of cellulose more impermeable comprising applying to surfaces of derivatives of cellulose a coating comprising triacontane.

4. The method of rendering surfaces of cellulose acetate more impermeable comprising applying to surfaces of cellulose acetate a coating comprising triacontane.

5. Method of imparting greater impermeability to foils or films containing cellulosic material comprising applying to at least one surface of the same a coating comprising triacontane.

6. Method of imparting greater impermeability to foils or films containing cellulose acetate comprising applying to at least one surface of the same a coating comprising triacontane.

7. Method of imparting greater impermeability to foils or films containing cellulosic material comprising applying to at least one surface of the same a coating comprising triacontane and a derivative of cellulose.

8. Method of imparting greater impermeability to foils or films containing cellulose acetate comprising applying to at least one surface of the same a coating comprising triacontane and a derivative of cellulose.

9. Method of imparting greater impermeability to foils or films containing cellulosic material comprising applying to at least one surface of the same a coating comprising triacontane and benzyl cellulose.

10. Method of imparting greater impermeability to foils or films containing cellulose acetate comprising applying to at least one surface of the same a coating comprising triacontane and benzyl cellulose.

11. Method of imparting greater impermeability to foils or films containing cellulosic material comprising applying to at least one surface of the same a coating comprising triacontane, a derivative of cellulose, a plasticizer for the derivative of cellulose and a resin.

12. Method of imparting greater impermeability to foils or films containing cellulosic material comprising applying to at least one surface thereof a coating comprising triacontane, benzyl cellulose, a plasticizer and a resin.

13. Articles having a surface of cellulosic material and having thereon a layer comprising triacontane.

14. Articles having a surface of cellulose acetate and having thereon a layer comprising triacontane.

15. Films or foils of cellulosic material which are relatively impervious to moisture having on at least one surface thereof a layer comprising triacontane.

16. Films or foils of derivatives of cellulose which are relatively impervious to moisture having on at least one surface thereof a layer comprising triacontane.

17. Films or foils of cellulose acetate which are relatively impervious to moisture having on at least one surface thereof a layer comprising triacontane.

18. Films or foils of cellulosic material which are relatively impervious to moisture having on at least one surface thereof a layer comprising triacontane and a derivative of cellulose.

19. Films or foils of cellulosic material which are relatively impervious to moisture having on at least one surface thereof a layer comprising triacontane and benzyl cellulose.

20. Films or foils of cellulosic material which are relatively impervious to moisture having on at least one surface thereof a layer comprising triacontane, a derivative of cellulose, a plasticizer for the derivative of cellulose, and a resin.

GEORGE W. SEYMOUR.